United States Patent [19]
Cicotte et al.

[11] Patent Number: 5,078,024
[45] Date of Patent: * Jan. 7, 1992

[54] CONTROL PEDAL APPARATUS FOR A MOTOR VEHICLE

[75] Inventors: Edmond B. Cicotte, Utica; Gabriel M. Sitrin, West Bloomfield, both of Mich.

[73] Assignee: Comfort Pedals Inc., Warren, Mich.

[ * ] Notice: The portion of the term of this patent subsequent to Feb. 5, 2008 has been disclaimed.

[21] Appl. No.: 650,928

[22] Filed: Feb. 5, 1991

Related U.S. Application Data

[63] Continuation of Ser. No. 345,784, May 1, 1989, Pat. No. 4,989,474, which is a continuation-in-part of Ser. No. 188,122, Apr. 25, 1988, Pat. No. 4,875,385, Continuation of Ser. No. 897,197, Aug. 18, 1986, abandoned.

[51] Int. Cl.$^5$ ................................................ G05G 1/14
[52] U.S. Cl. ........................................ 74/512; 74/513; 74/560
[58] Field of Search .................. 74/512, 560, 513, 522

[56] References Cited
U.S. PATENT DOCUMENTS

5,010,782 4/1991 Asano et al. .......................... 74/512

*Primary Examiner*—Rodney M. Lindsey
*Attorney, Agent, or Firm*—Krass & Young

[57] ABSTRACT

A control pedal apparatus for adjusting a control pedal of a motor vehicle such for example as a brake pedal, an accelerator pedal, or a clutch pedal. The mechanism includes a pedal arm, an adjustor member, and a bracket secured to the fire wall of the vehicle. The mechanism allows the position of the pedal pad to be adjusted slidably on the adjustor member without disturbing the position of the particular control element actuated by the pedal assembly, and selectively moves the pivot axis of the pedal assembly to maintain a fixed mechanical advantage of the pedal assembly irrespective of the position of adjustment of the pedal arm on the adjustor member. Coacting slots allow the pivot axis to be selectively moved during adjustment of the assembly but coact in response to depression of the pedal to fix the position of the pivot axis in any adjusted position of the pedal arm so that the pedal assembly pivots positively about the instantaneous assembly axis in any adjusted position of the pedal arm. The adjustment of the pedal arm is accomplished by the rotation of a screw engaging a nut on the pedal arm with the screw being driven by an electric motor.

16 Claims, 5 Drawing Sheets

CONTROL PEDAL APPARATUS FOR A MOTOR VEHICLE

This application is a continuation of U.S. patent application Ser. No. 345,784 filed on May 1, 1989, now U.S. Pat. No. 4,989,474, which is a continuation-in-part of U.S. patent application Ser. No. 188,122 filed on Apr. 25, 1988, now U.S. Pat. No. 4,875,385, which is a continuation of U.S. patent application Ser. No. 897,197 filed on Aug. 18, 1986, now abandoned.

INTRODUCTION

This invention relates to control pedal apparatuses and more particularly to adjustment means for selectively adjusting the position of one or more of the control pedals of a motor vehicle.

BACKGROUND OF THE INVENTION

In a conventional automotive vehicle, pedals are provided for controlling brakes and engine throttle. If the vehicle has a manual transmission, a clutch pedal is also provided. These pedals are foot operated by the driver. In order for the driver to obtain the most advantageous position for working these controls, the vehicle front seat is usually slidably mounted on a seat track with means for securing the seat along the track in a plurality of adjustment positions.

The adjustment provided by moving the seat along the seat track does not accommodate all vehicle operators due to differences in anatomical dimensions. Further, there is growing concern that the use of seat tracks, and especially long seat tracks, constitutes a safety hazard in that the seat may pull loose from the track during an accident with resultant injuries to the driver and/or passengers. It is therefore desirable to either eliminate the seat track entirely or shorten the seat track to an extent that it will be strong enough to retain the seat during an impact. Shortening or eliminating the seat track requires that means be provided to selectively move the various control pedals to accommodate various size drivers.

Various proposals have been made in the past to provide selective adjustment of the pedal positions to accommodate various size drivers but none of these prior art adjustment proposals has met with any significant commercial acceptance since the proposed mechanisms have been unduly complex and expensive, and/or have been extremely difficult to operate, and/or have accomplished the required pedal adjustment only at the expense of altering other critical dimensional relationships as between the driver and the various pedals.

SUMMARY OF THE INVENTION

This invention is directed to a simple, inexpensive control pedal mechanism in which the pedal position is readily adjusted without disturbing the essential dimensional relationships in the control environment.

The invention control pedal apparatus comprises a pedal assembly including an adjustor member and an elongated pedal arm mounted on the adjustor member; pivot means mounting the upper end of the pedal assembly for pivotal movement on a mounting bracket structure about a pivot axis; a pedal pad mounted on the lower end of the pedal arm; attachment means on the adjustment member defining an attachment point for attachment of a control member for operation of a control system of the vehicle in response to pivotal movement of the pedal assembly upon the application of operator pressure to the pedal pad; and pedal adjustor means operative to selectively adjust the position of the pedal pad relative to the mounting bracket and operative during such adjustment to selectively vary both the distance from the pivot axis to the pedal pad and the distance from the pivot axis to the attachment point. This arrangement allows the pedal to be selectively adjusted to suit the individual driver while selectively maintaining desired ergonomic relationships between the control pedal assembly and the driver.

According to a further feature of the invention, the pedal adjustment means is operative during the selective movement of the pedal pad relative to the bracket to maintain a substantially fixed ratio between the distance from the pivot axis to the pedal pad and the distance from the pivot axis to the attachment point of the vehicular control member. This arrangement allows the pedal pad to be selectively adjusted without disturbing the optimal mechanical advantage previously built into the pedal system during the original ergonomic design of the vehicle.

According to a further feature of the invention, the distances from the pivot axis to the attachment point and to the pedal pad are selectively varied by selectively moving the pivot axis relative to the mounting bracket. With this arrangement, the pivot axis may be selectively moved during the adjustment operation to selectively and precisely control the mathematical relationships between the distances from the pivot axis to the attachment point and to the pedal pad so as to selectively control the desired ergonomic relationships in the overall pedal system.

In the disclosed embodiments of the invention, the pedal arm and adjustor member move relative to each other during the pedal adjustment process but move as a single unit, in any position of relative adjustment of the pedal arm on the adjustor member, when pressure is applied to the pedal pad. This arrangement allows the pedal arm to be selectively adjusted on the adjustor member to provide a desired pedal pad position without disturbing the position of the vehicular control member secured to the adjustor member, and allows the pedal arm and adjustor member to connect positively and act in unison to positively control the vehicle irrespective of the relative positioning of the pedal arm on the adjustor member.

According to a further feature of the disclosed embodiments, a nut is carried by the pedal arm and a screw threadably engages the nut and is precluded from axial movement so that rotation of the screw operates to slidably adjust the pedal arm on the adjustor member. This arrangement provides an inexpensive and positive means of readily adjusting the pedal arm on the adjustor member.

In one disclosed embodiment of the invention, the pedal adjustor means includes a pair of spaced pins on the pedal arm slidably guiding in spaced parallel tracks on the adjustor member, an oblique cam slot in the pedal arm, and mating generally vertical slots in the bracket and in the adjustor member intersecting the cam slot; the nut is mounted on the pedal arm between the guide pins; and the pivot means comprises a pivot pin slidably received in the cam slot and in the matching slots on the bracket and on the adjustor member. With this arrangement, the pivot axis is moved cammingly upwardly and downwardly in response to sliding adjustment of the pedal arm on the adjustor member so as to selectively maintain the desired mechanical advantage originally built into the control pedal system.

In another disclosed embodiment of the invention, the pedal assembly is mounted for sliding movement on the adjustor member, a cam member is pivotally mounted on the adjustor member and engages the pivot pin, and a cam surface on the pedal assembly engages the cam member as the pedal assembly is slidably adjusted on the adjustor member to selectively move the pivot pin and thereby selectively move the pivot axis of the pedal assembly during the adjustment process.

DETAILED DESCRIPTION OF THE PREFERRED EMBODIMENTS

Figures 1, 2:
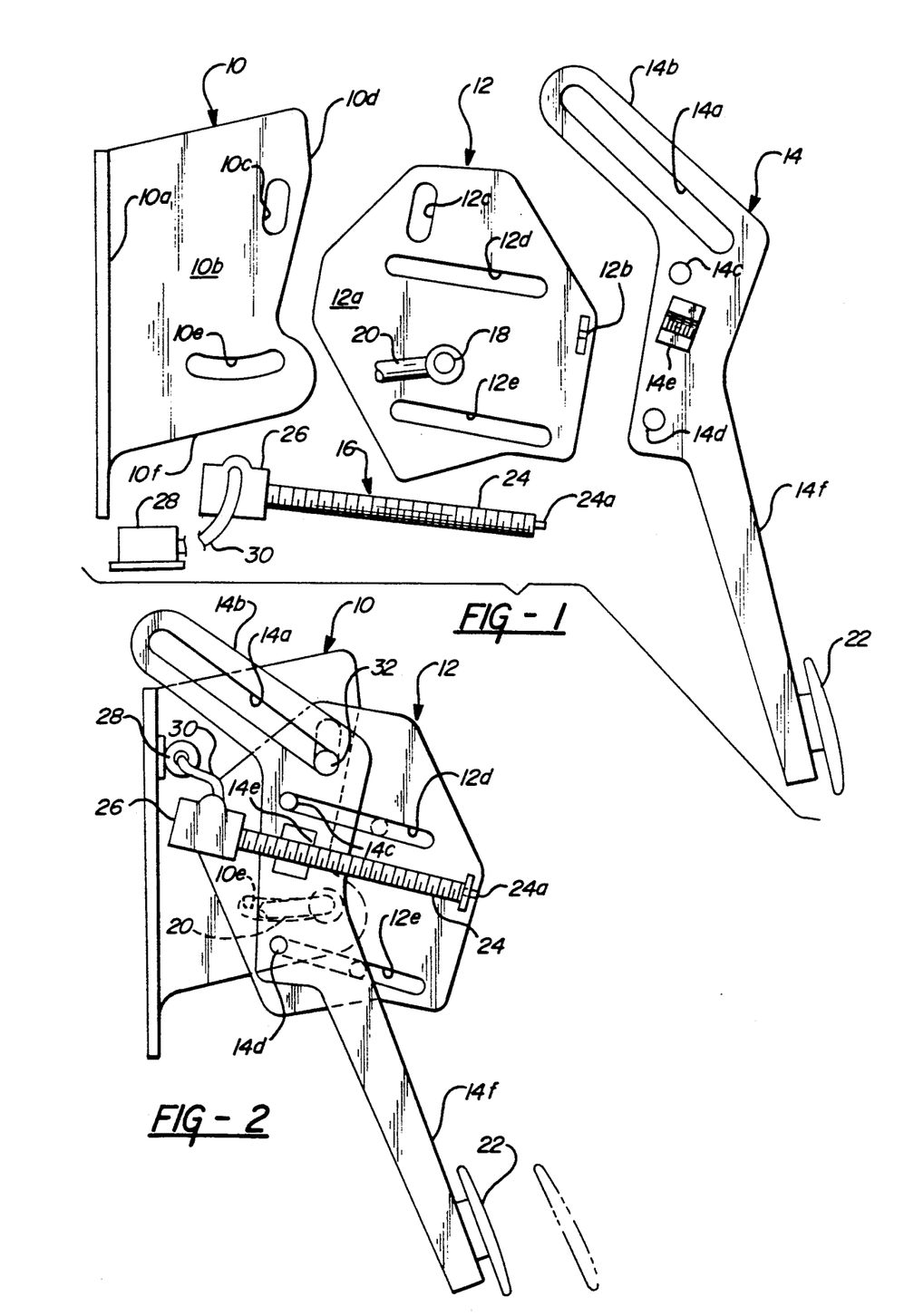
FIG. 1 is an exploded view of a first embodiment of the invention control pedal apparatus.
FIG. 2 is an assembled view of the control pedal apparatus of FIG. 1.

The control pedal apparatus of the FIGS. 1 and 2 embodiment, broadly considered, comprises a bracket 10, an adjustor member 12, a pedal arm 14, and a screw assembly 16.

Bracket 10 is formed of a suitable metallic material and includes a flange portion 10a for attachment of the bracket to the fire wall of the motor vehicle and a main body portion 10b. A generally vertical slot 10c is formed in the upper portion of main body portion 10b adjacent its forward edge 10d. An arcuate slot 10e is formed in main body portion 10b adjacent its lower edge 10f. Although bracket 10 is shown for simplicity as comprising a single plate member, in actuality bracket 10 would be fabricated as two laterally spaced identical plate members suitably rigidly joined together.

Adjustor member 12 is formed of a suitable metallic material and includes a main body portion 12a, a lug portion 12b, and a pin 18. Main body portion 12a is generally planar and defines an upper generally vertically extending slot 12c corresponding to slot 10c in bracket 10, and a pair of parallel generally horizontally extending straight slots 12d and 12e. Pin 18 extends normally from main body portion 12a between slots 12d and 12e and is sized to fit slidably in slot 10e in bracket 10. A brake master cylinder push rod 20 is pivotally mounted on pin 18 so that pin 18 defines an attachment point for the brake master cylinder control rod. Whereas adjustor member 12 is shown for simplicity as a single plate member, adjustor member 12 in actuality would be formed of two spaced identical members rigidly joined together and sized to fit in sandwich fashion between the two spaced plates of bracket 10.

Pedal arm 14 is formed of a suitable metallic material and includes an oblique slot 14a in the upper end 14b of the arm, a pair of vertically spaced pins 14c and 14d projecting laterally from the arm, a nut 14e rigidly secured to the arm between pins 14c and 14d, and a lower arm portion 14f. A brake pedal pad 22 is secured to the lower end of pedal arm 14. Pedal arm 14, as shown, comprises a single plate like member and is fitted in sandwich fashion between the spaced plates of adjustor member 12.

Screw assembly 16 comprises a screw 24, an adapter member 26, and a motor 28. Screw 24 has a size and pitch to match the size and pitch of nut 14e on pedal arm 14 and includes a pilot portion 24a at its forward end journaling in a suitable bore in lug portion 12b of adjustor member 12. Adapter member 26 mounts the rear end of screw 24 and functions in known manner to convert rotary movement of a flexible cable 30 connected to the output of a motor 28 into rotary movement of screw 24.

The various components of the control pedal apparatus of FIG. 1 are seen in assembled relation in FIG. 2. In assembled relation, pins 14c and 14d of pedal arm 14 are slidably received in slots 12d and slots 12e respectively of adjustor member 12; push rod pin 18 is slidably received in slot 10e of bracket 10; screw 24 is threadably received in nut 14e with pilot portion 24a journaling in lug portion 12b of adjustor member 12; motor 28 is mounted on bracket 10 with drive cable 30 drivingly connected to adapter member 26; and a pivot pin 32 is slidably received in slots 14a, 12c and 10c. It will be understood that pivot pin 32 includes head portions at each end to preclude axial movement of the pin out of the slots.

In operation of the brake pedal apparatus of FIGS. 1 and 2, motor 28 is suitably actuated to rotate screw 24 which causes nut 14e to travel along the rotating screw to slidably move pedal arm 14 relative to adjustor member 12 with the precise direction of the relative movement defined by sliding movement of pins 14c and 14d in slots 12d and 12e. This sliding movement of pedal arm 14 on adjustor member 12 moves pedal 22 forwardly and rearwardly to ergonomically accommodate drivers of various statures.

As pedal arm 14 slides relative to adapter member 12, pivot pin 32 moves cammingly upwardly or downwardly in slots 10c and 12c by virtue of the camming action of oblique slot 14a in the pedal arm. Specifically, as pedal 22 is adjusted forwardly, pivot pin 32 is moved upwardly in slots 10c and 12b and as a pedal pad 22 is adjusted rearwardly This upward and downward movement of pivot pin 32 in response to forward and rearward movement of the pedal pad has the effect of maintaining the ratio between the distance from the pivot axis defined by pivot pin 32 to pedal pad 22 and the distance from the pivot axis to the attachment point defined by push rod pin 18 substantially constant so that the mechanical advantage initially ergonomically built into the brake pedal assembly is maintained in all positions of adjustment of the pedal arm relative to the adjustor member.

When operator pressure is applied to pedal pad 22 in any position of relative adjustment of pedal arm 14 on adjustor member 12, the pedal arm and adjustor member move as a single unit about the pivot axis defined by the instantaneous position of pivot pin 32 whereby to apply the brakes of the vehicle through the push rod 20. Since the adjustor member 12 does not move during the adjustment of pedal arm 14 on the control member 12, the attachment point defined by push rod pin 18 is not moved during the adjustment process so that the critical interrelationship between the push rod and the brake master cylinder is not disturbed. In FIG. 2, a rearwardly adjusted position of pedal arm 14, together with the corresponding positions of pivot pin 32 and pins 14c and 14d, are shown in solid lines whereas adjusted positions of these elements, corresponding to a relatively forward position of pedal pad 22, are shown in dotted lines.

The control pedal apparatus of the embodiment of FIGS. 3—6, broadly considered, includes a mounting bracket assembly 40; an adjustor member assembly 42; a cam plate assembly 44; a pivot pin 46; a pedal arm assembly 48; and a screw assembly 50.

Figure 3:
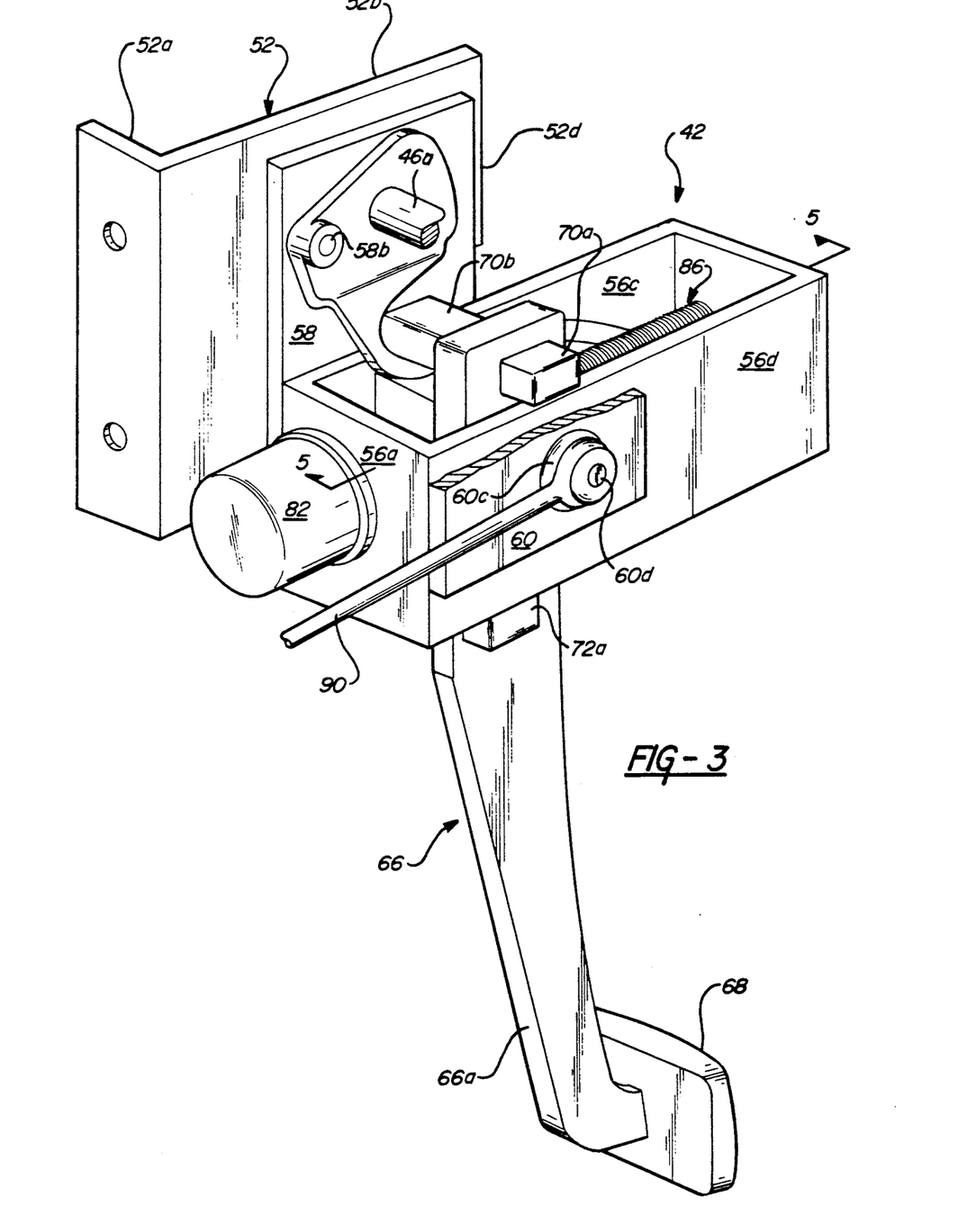
FIG. 3 is a perspective somewhat fragmentary view of a second embodiment of the invention control pedal apparatus.
Figure 4:
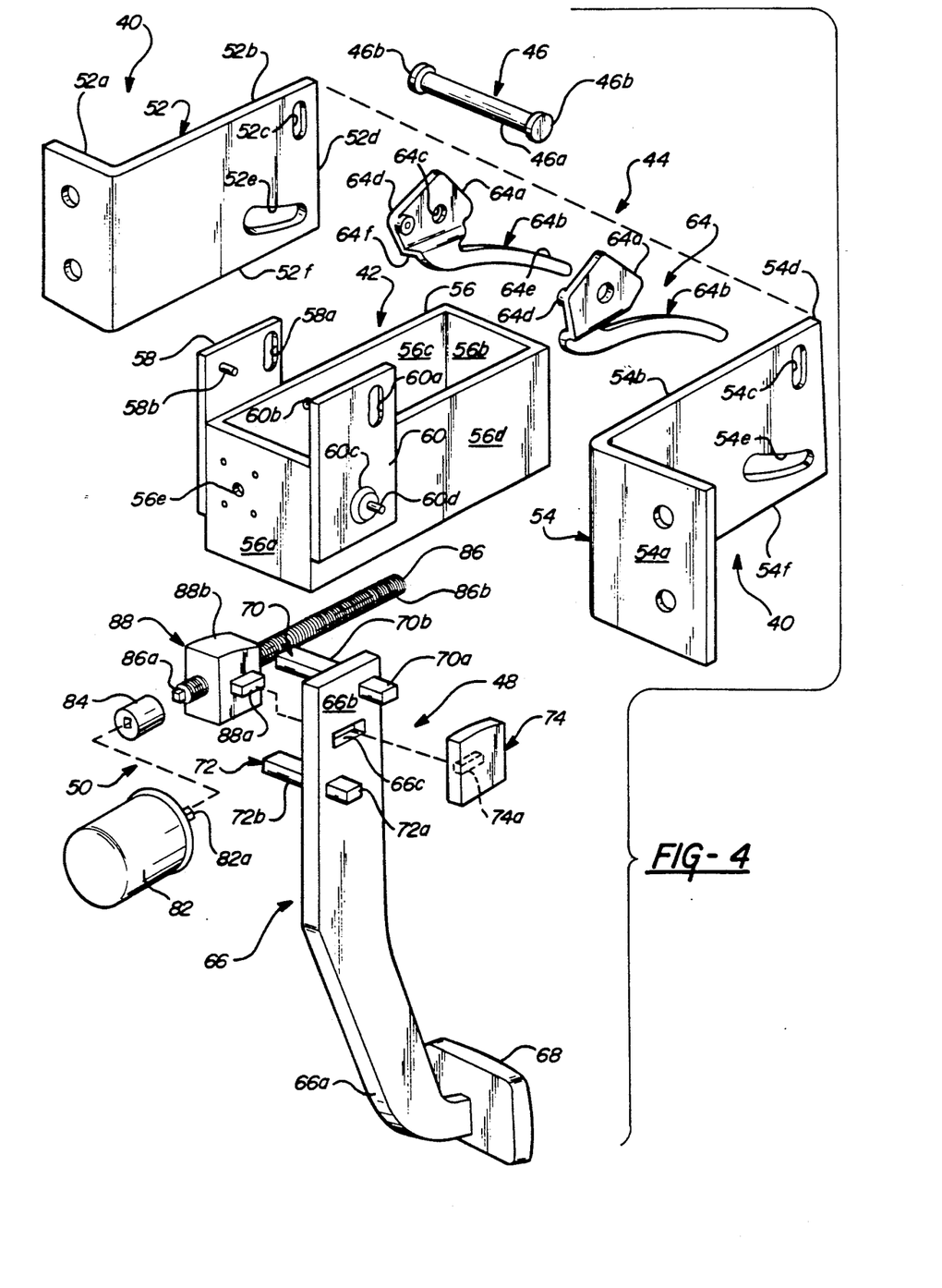
FIG. 4 is an exploded view of the control pedal apparatus of FIG. 3.
Figure 7:
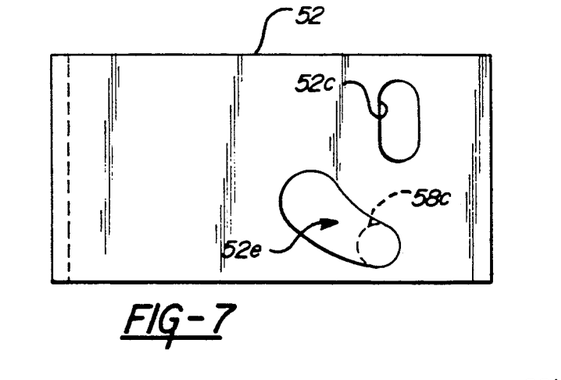
FIG. 7 is a detail view of a mounting bracket utilized in the control pedal apparatus of FIG. 3.

Mounting bracket assembly 40 includes a pair of oppositely configured left and right mounting brackets 52 and 54 each formed of a suitable metallic material and each including a flange portion 52a, 54a for attachment of the bracket to the fire wall of the motor vehicle and a main body portion 52b, 54b. A generally vertical slot 52c, 54c is formed in the upper portion of the main body portion of each bracket adjacent the respective forward edge 52d, 54d of the bracket and an arcuate slot 52e, 54e is formed in the main body portion of each bracket below and rearwardly of the respective vertical slot 52c, 54c and adjacent the respective lower edge 52f, 54f of the bracket. The upper arcuate edge of each arcuate slot 52e, 54e is centered on the center point of the lower semi-circular end of the respective vertical slot 52c, 54c and the lower arcuate edge of each arcuate slot 52e, 54e is centered on the center point of the upper semi-circular end of the respective vertical slot 52c, 54c.

Adjustor member assembly 42 includes a tubular housing 56 and a pair of adjustor brackets 58, 60.

Tubular housing 56 includes end walls 56a, 56b and side walls 56c, 56d defining an opening 62 therewithin. A bore 56e is provided in end wall 56a.

Adjustor brackets 58 and 60 are suitably secured to the outboard side faces of side walls 56c, 56d adjacent rear end wall 56a and each includes a vertical slot 58a, 60a in the upper portion of the bracket adjacent the forward edge of the bracket; a pivot pin 58b, 60b extending inwardly from the inboard face of the upper portion of the bracket adjacent the rear edge of the bracket; and a guide pin portion 58c, 60c on the outboard face of the bracket adjacent the lower edge of the bracket. In addition, bracket 60 includes a pivot pin portion 60d extending outboard of and coaxial with guide pin portion 60c. The slots 58a, 60a, in the adjustor brackets generally correspond in size and shape to the slots 52c, 54c in the mounting brackets.

Cam assembly 44 includes a pair of cam plates 64 formed as mirror images, one or the other, and each including an upper mounting portion 64a and a lower cam portion 64b. Upper portion 64a defines an oval aperture or slot 64c and a journal 64d adjacent the rear edge of the plate. Lower cam portion 64b of each cam plate has a generally arcuate elongated configuration and defines convex arcuate guide surface 64e along its upper edge. Each cam plate 64 further includes an offset portion 64f between upper portion 64a and lower portion 64b.

Pivot pin 46 is preferably formed of a ferrous material and includes a main body shank portion 46a and headed end portions 46b. Shank portion 46a has a diameter approximating the minor diameter of oval slot 64c but somewhat less than the major diameter of slot 64c.

Pedal arm assembly 48 includes a pedal arm 66 and a pedal pad 68 secured to the lower end 66a of the pedal arm. A pair of generally rectangular guide pins 70, 72 extend with a press fit transversely through the upper end 66b of the pedal arm with guide pin 70 positioned adjacent the upper forward corner of the pedal arm and guide pin 72 positioned in spaced relation below guide pin 72 adjacent the rear edge of the pedal arm. Each guide pin 70, 72 includes a relatively short portion 70a, 72a extending laterally from one side face of the pedal arm and a relatively long portion 70b, 72b extending laterally from the other side face of the pedal arm. A rectangular slot 66c is provided in the upper portion 66b of pedal arm generally centrally of the pedal arm and generally vertically midway between pin 70 and pin 72.

Pedal arm assembly 48 further includes a plastic spacer 74 of generally rectangular configuration and including a rib portion 74a sized to be press fit into slot 66c at one side of the pedal arm. The upper face 74b of spacer 74 has a convex cam configuration for coaction with the near cam plate 64 as viewed in FIG. 5.

Screw assembly 50 includes an electric motor 82, a coupling 84, a screw 86 and a plastic nut 88. Motor 82 may, for example, be of the type available from Beuler Products, Inc. of Raleigh, N.C. as Beuler DC Miniature Gear Motor Series 61.13 and screw and nut assembly 86, 88 may, for example, be of the type available from Nook Industries of Cleveland, Ohio as Part No. RH 11025. Coupling 84 is intended to drivingly engage the flatted forward end 82a of the output shaft of motor 82 and the flatted rear end 86a of screw 86 so as to drivingly couple the output shaft of the motor to the screw, and nut 88 has a generally blocklike, rectangular configuration including a rib portion 88a sized to be press fit into slot 66c in the upper end of pedal arm 66 at the side of the pedal arm opposite the side mounting spacer 74. The upper face 88b of nut 88 has a convex cam configuration, identical to the configuration of spacer upper face 74b, for coaction with the remote cam plate 64 as viewed in FIG. 5.

In the assembled relation of the control pedal apparatus of FIGS. 3-6, the upper end 66b of pedal arm 66 is received in the opening 62 of housing 42 between adjustor brackets 58, 60 with the lower faces of pin portions 70a, 70b respectively slidably guiding on the upper edges of housing side walls 56d, 56c and with the upper faces of pin portions 72a, 72b respectively slidably guiding on the lower edges of side walls 56d, 56c; nut rib portion 88a is received with a press fit in one side of pedal arm slot 66c and spacer rib portion 74a is received with a press fit in the other side of pedal arm slot 66c; the outboard faces of nut 88 and spacer 74, respectively, slidably engage the inboard faces of housing side walls 56d, 58d to positively position the pedal arm laterally between the housing side walls; motor 82 is secured to the outboard face of end wall 56a of the housing 56 with the motor output shaft 82a extending through bore 56e for engagement with coupling 84; screw 86 is coupled at its rear end 86a to coupler 84 and threadingly engages nut 88 with the forward portion 86b of the screw positioned within the forward portion of opening 62; journals 64d of cam plates 64 are pivotally mounted on pivot pins 58b, 60b of brackets 58, 60 with pin portion 70a positioned directly over the arcuate guide surface 64e of the cam portion 64b of the near cam plate and pin portion 70b positioned directly over the arcuate guide surface 64e of the cam portion 64b of the remote cam plate and with the lower cam portions 64b positioned respectively immediately inboard of housing side walls 56c, 56d in the forward portion of opening 62 and respectively resting at their lower convex edges 64f on the upper convex faces 88b and 74b of nut 88 and spacer 74; pivot pin 46 passes respectively through slot 52c, slot 58a, slots 64c, slot 60a, and slot 54c with the respective pin head portions 46b positioned respectively adjacent the outboard face of the main body portion of mounting bracket 52 and the outboard face of the main body portion of mounting bracket 54; pin guide forward ends of arcuate slots 52e, 54e to define the forwardly pivoted rest position of the pedal arm assembly and adjustor member assembly and to preclude vertical movement of pin 46 in slots 52c, 58a, 60a, 54c irrespective of the adjusted vertical position of pin 46 within these slots; and the push rod 90 of the brake master cylinder of the vehicle is pivotally mounted on pin 60d.

In the normal operation of the control pedal apparatus of FIGS. 3–6, in any position of adjustment of the pedal arm assembly 48 relative to the adjustor assembly 42, operator pressure applied against pedal pad 68 causes the pedal arm assembly to move in unison with the adjustor member assembly about the axis of pivot pin 46 to move push rod 90 to actuate the brake master cylinder with the pivotal joint movement of the pedal arm assembly and adjustor member assembly being accompanied by movement of guide portions 58c, 60c in guide slots 52e, 54e. As soon as adjustor brackets 58,60 move pivotally in response to depression of pedal pad 68, adjustor bracket slots 58a, 60a assume an intersecting disposition with respect to mounting bracket slots 52c, 54c so as to effectively lock pin 56 in its adjusted vertical position within slots 52c, 58a, 60a and 54c so that this function need no longer be performed by the interaction of journals 58c, 60c in arcuate slots 52e, 543e.

When it is desired to adjust the position of pedal arm assembly 48 relative to the mounting bracket assembly, and thereby adjust the position of the pedal arm assembly to suit the needs of the particular driver of the vehicle, motor 82 is suitably energized to rotate screw 86 and thereby, via the intermediary of nut 88 carried by pedal arm 66, move the pedal arm assembly slidably along housing 56 to move the pedal pad 68 closer to or further away from the driver depending upon the stature of the driver. This sliding movement of the pedal arm assembly relative to the housing 56 comprises sliding movement of pin portions 70a, 70b, 72a, 72b along the respective upper and lower edge surfaces of side walls 56c and 56d of the adjustor housing. As the pedal arm assembly moves slidably along the adjustor member housing, pin portions 70a, 70b, and cam faces 88b, 74b coact with the lower cam portions 64b of the cam plates to selectively pivot the cam plates about the axis of pins 58b, 60b to thereby move slots 64c, 64c upwardly or downwardly and thereby move pivot pin 46 upwardly or downwardly in aligned slots 52c, 58a, 60a and 54c so as to effectively adjust the pivot axis of the pedal arm assembly as the pedal arm assembly is adjusted relative to the adjustor member assembly.

The selective upward and downward movement of the pivot pin as the pedal arm assembly is moved adjustably relative to the adjustor member assembly has the effect of selectively varying both the distance from the pivot axis of the pedal arm assembly to the pedal pad 68 and the distance from the pivot axis to the attachment point 60d for the push rod of the master cylinder. The manner and the extent to which each of these distances is adjusted during the adjustment of the pedal arm assembly relative to the adjustor member assembly may be selectively controlled to produce any of various desired results. In the preferred embodiment of the invention, the various parts are dimensioned and configured such that the pivot pin 46 is moved by an amount during the adjustment of the pedal arm assembly relative to the adjustor member assembly such that a substantially fixed ratio is maintained between the distance form the pivot axis to the pedal pad and the distance from the pivot axis to the attachment point of the brake push rod. This has the effect of maintaining the desired ergonomically determined mechanical advantage in the control pedal apparatus so that the feel and operation of the control pedal assembly does not vary with variations in the adjusted position of the pedal arm assembly relative to the adjustor member assembly.

Figure 5:
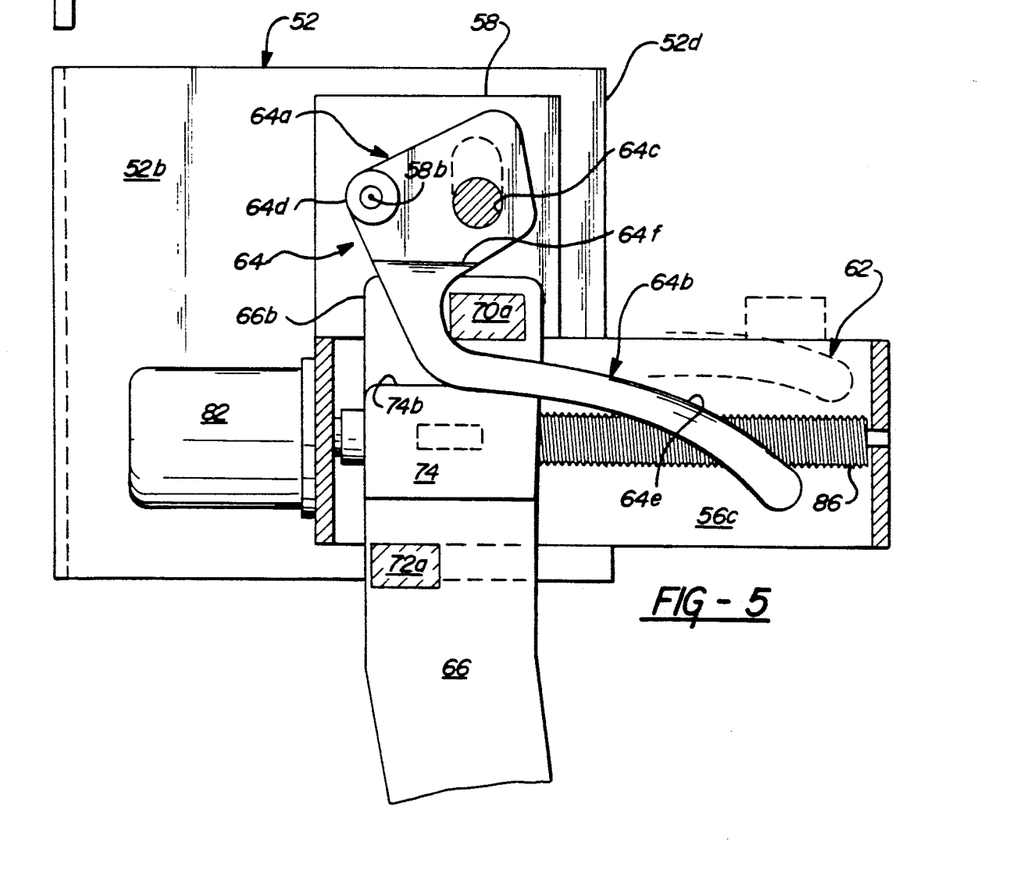
FIG. 5 is a cross sectional view taken on line 5—5 of FIG. 3.
Figure 6:
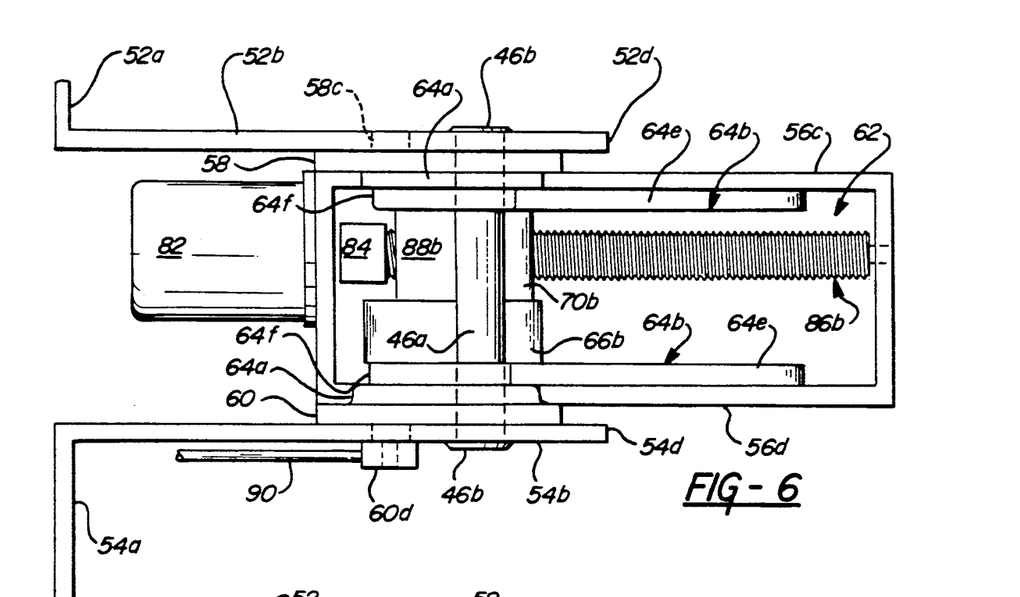
FIG. 6 is a plan view of the control pedal apparatus of FIG. 3.

As best seen in FIG. 5, the actual engagement as between the pedal arm assembly and the cam plates 64 as the pedal arm assembly is moved forwardly, or to the right as viewed in FIG. 5, occurs as a camming contact between the lower concave arcuate edges 64f of lower cam portion 64b and convex upper surfaces 74b, 88b of spacer 74 and nut 88 and the contact as between the cam plates and the pedal arm assembly as the pedal arm assembly moves rearwardly, or to the left as viewed in FIG. 5, occurs as a point contact between the upper convex edges of lower cam portions 64b and the rounded lower rearward corners of pin portions 70a, 70b.

Figure 8:
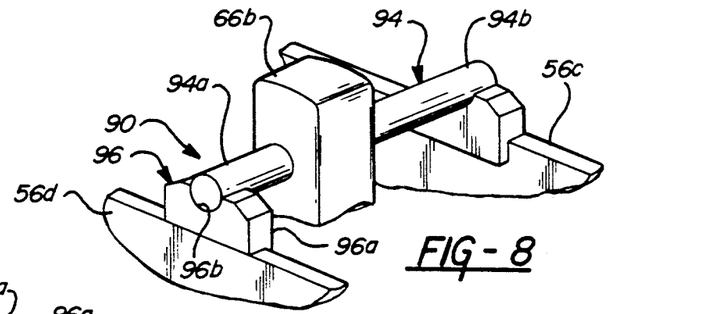
FIGS. 8, 9 and 10 are fragmentary detailed views of a third embodiment of the invention control pedal apparatus.
Figure 9:
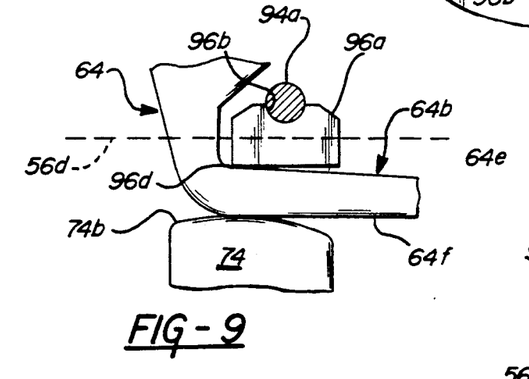
Figure 10:
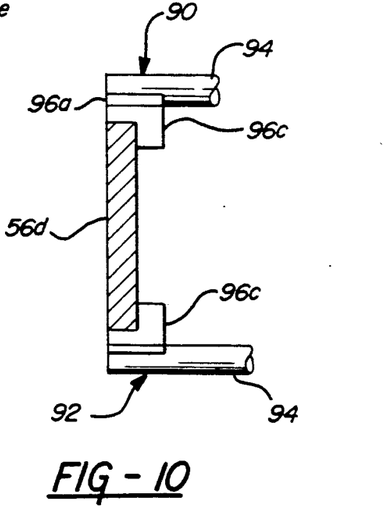

The modified control pedal apparatus of FIGS. 8, 9 and 10 is generally similar to the apparatus of FIGS. 3–7 except that the rectangular pins 70 and 72 are respectively replaced by pin assemblies 90 and 92. Pin assembly 90 includes a round stock pin 94, passing through pedal arm 66 to define a short pin portion 94a and a long pin portion 94b, and a pair of shoes 96 of generally L configuration and including a saddle block portion 96a defining a saddle 96b for receipt of the ends of pin portions 94a, 94b and a flange or guide portion 96c slidably guiding on the inboard face of a respective housing side wall 54c, 56c.

Pin assembly 92 is identical to pin assembly 90 with the exception that the shoes 96 are inverted with respect to the shoes 96 of the pin assembly 90 and the pin 94 is positioned beneath the saddle portion 96a of the shoes.

In the use of the control pedal apparatus of FIGS. 8, 9 and 10, the pivotal movement of the cam plates 64 in response to rightward or forward movement of the pedal assembly along the housing 54 occurs, as in the FIG. 3–7 embodiment, as camming contact between the convex cam faces 74b, 88b of the spacer and nut with the lower concave edges plates in response to leftward or rearward movement of the pedal assembly along the housing 56 occurs as point contact between the upper edges 64e of the lower cam portions of the cam plates and the rounded lower rearward corner 96d of the flange portions 96c of the shoes 96 of the pin assembly 90.

The invention control pedal adjustment mechanism will be seen to provide a simple and efficient means of readily adjusting the control pedal to suit the particular ergonomic requirements of the particular driver without disturbing the other critical dimensional relationships between the pedal assembly and the related control elements of the motor vehicle.

Whereas preferred embodiments of the invention have been illustrated and described in detail, it will be apparent that various changes may be made in the disclosed embodiments without departing from the scope or spirit of the invention.

We claim:

1. A control pedal apparatus for a motor vehicle comprising:
   a pedal assembly including an adjustor member and an elongated pedal arm;
   means mounting said pedal arm on said adjustor member for adjustable movement on said adjustor member;
   pivot means mounting the upper end of said pedal assembly on the associated vehicle structure for pivotal movement about a pivot axis;
   a pedal pad mounted on the lower end of said pedal arm;
   attachment means on said adjustor member defining an attachment point for attachment of a control member for operation of a control system of the vehicle in response to pivotal movement of said pedal assembly upon the application of operator pressure through said pedal pad; and
   pedal adjustor means operative to selectively adjust the position of said pedal arm on said adjustor member and thereby adjust the position of said pedal pad relative to the associated vehicle structure and operative during such adjustment to selectively vary both the distance from said pivot axis to said pedal pad and the distance from said pivot axis to said attachment point.

2. A control pedal apparatus according to claim 1 wherein:
   said pedal adjustor means are operative during such adjustment to maintain a substantially fixed ratio between the distance from said pivot axis to said pedal pad and the distance from said pivot axis to said attachment point.

3. A control pedal apparatus according to claim 1 wherein:
   said pedal adjustor means operates to selectively vary the distances from said pivot axis to said attachment point and to said pedal pad by selectively moving said pivot axis relative to the associated vehicle structure during such adjustment.

4. A control pedal apparatus according to claim 3 wherein:
   the associated vehicle structure comprises a mounting bracket;
   said control pedal apparatus includes said mounting bracket; and
   said mounting bracket is adapted to be mounted on a fixed structure of the vehicle.

5. A control pedal apparatus for a motor vehicle comprising:
   a pedal assembly including an adjustor member and an elongated pedal arm;
   means mounting said pedal arm on said adjustor member for adjustable movement on said adjustor member;
   pivot means mounting the upper end of said pedal assembly on the associated vehicle structure for pivotal movement about a pivot axis;
   a pedal pad mounted on the lower end of said pedal arm;
   attachment means on said adjustor member defining an attachment point for attachment of a control member for operation of a control system of the vehicle in response to pivotal movement of said pedal assembly upon the application of operator pressure through said pedal pad; and
   pedal adjustor means operative to selectively adjust the position of said pedal arm on said adjustor member and thereby adjust the position of said pedal pad relative to the associated vehicle structure and operative during such adjustment to vary the distance from said pivot axis to said pedal pad and the distance from said pivot axis to said attachment point while maintaining a substantially fixed ratio between said distances.

6. A control pedal apparatus for a motor vehicle comprising:
   a pedal assembly including an adjustor member and an elongated pedal arm mounted on said adjustor member;
   pivot means mounting the upper end of said pedal assembly on the associated vehicle structure for pivotal movement about a pivot axis;
   a pedal pad mounted on the lower end of said pedal arm;
   attachment means on said adjustor member defining an attachment point for attachment of a control member for operation of a control system of the vehicle in response to pivotal movement of said pedal assembly upon the application of operator pressure through said pedal pad; and
   pedal adjustor means operative to selectively adjust the position of said pedal pad relative to the associated vehicle structure and operative during such adjustment to selectively vary both the distance from said pivot axis to said pedal pad and the distance from said pivot axis relative to the mounting bracket during such adjustment;
   said pedal assembly being slidably moved on said adjustor member by said pedal adjustor means;
   said pivot means including a pivot pin;
   said pedal adjustor means including a cam member engaging said pivot pin and mounted for pivotal movement in response to sliding adjustment of said pedal assembly on said adjustor member to selectively move said pivot pin and thereby selectively move said pivot axis;
   said pedal arm including guide means slidably guiding on said adjustor member and engaging said cam member in response to adjustment of said pedal assembly on said adjustor member to pivot said cam member and move said pivot pin an thereby said pivot axis.

7. A control pedal apparatus according to claim 6 wherein:
   said cam member comprises a plate including a slot and an aperture;
   said guide means comprises a guide pin;
   said guide pin is received in said slot and said pivot pin passes through said aperture.

8. A control pedal apparatus for a motor vehicle comprising:
   an adjuster member adapted to be pivotally secured to a fixed structure of the motor vehicle and defining spaced upper and lower tracks;
   a pedal assembly including a pedal arm, a pedal pad secured to the lower end of said pedal arm, and a pair of guide members secured to the upper end of said arm and respectively slidably engaging said upper and lower tracks; and
   means operative to adjustably move said pedal assembly relative to said adjuster member with said guide members respectively sliding along said upper and lower tracks;

said adjustor member comprising a tubular member open at its upper and lower ends and including spaced side walls;

said upper and lower tracks being defined respectively proximate the upper and lower portions of said side walls; and said guide members comprising upper and lower pin assemblies carried on the upper end of said pedal arm in vertically spaced relation and extending laterally on opposite sides of said pedal arm for respective sliding engagement with said upper and lower tracks.

9. A control pedal apparatus for a motor vehicle comprising:

means defining a vertically extending slot;

an adjustor member including a vertically extending slot and defining an attachment point for attachment of a control member for operation of a control system of the vehicle;

a pivot pin passing through said slots;

a pedal arm mounted on said adjustor member proximate its upper end and having a pedal pad at its lower end; and pedal adjustor means operative to selectively adjust the position of said pedal arm relative to said adjustor member and operative during such adjustment to move said pivot pin in said slots;

said slots being aligned with said pedal arm in its rest position to allow movement of said pivot pin in said slots during adjustment of the pedal arm relative to said adjustor member but assuming an intersecting relative disposition upon pivotal movement of said pedal arm toward its working position to lock said pivot pin in its instantaneous position of adjustment in said slots.

10. A control pedal apparatus according to claim 9 wherein:

said pedal adjustor means includes cam means operative in response to adjustment of said pedal arm on said adjustor member to move said pivot pin in said slots.

11. A control pedal apparatus according to claim 10 wherein:

said cam means comprises a slot in the upper end of said pedal arm receiving said pivot pin and obliquely disposed with respect to said vertically extending slots.

12. A control pedal apparatus according to claim 10 wherein:

said cam means comprises a cam plate pivotally mounted on said adjustor member, receiving said pivot pin at a location spaced from the pivot axis of said cam plate, and moved pivotally in response to adjustment of said pedal arm on said adjustor member.

13. A control pedal apparatus for a motor vehicle comprising:

an adjustor member defining spaced upper and lower tracks;

a pedal assembly including a pedal arm, a pedal pad secured to the lower end of said pedal arm, and a pair of guide pins secured to the upper end of said arm and respectively slidably engaging said upper and lower tracks; and means operative to adjustably move said pedal assembly relative to said adjustor member with said guide pins respectively sliding along said upper and lower tracks.

14. A control pedal apparatus for a motor vehicle comprising:

a mounting bracket adapted to be mounted on a fixed structure of the vehicle;

a pedal assembly including an elongated pedal arm and an adjustment member;

a pivot member mounting the upper end of said pedal assembly for pivotal movement on said bracket about a pivot axis;

a pedal pad mounted on the lower end of said pedal arm;

attachment means on said adjustor member defining an attachment point for attachment of a control member for operation of a control system of the vehicle in response to pivotal movement of said pedal assembly upon the application of operator pressure to said pedal pad;

a pair of pins on said pedal arm spaced longitudinally along the length of said pedal arm;

a pair of parallel tracks on said adjustor member respectively slidably receiving said pins;

a nut carried by said pedal arm at a location therealong between said pins; and a screw positioned between said tracks and extending generally in a direction of said tracks, threadably engaging said nut, and operative in response to rotation of said screw to cause said pins to slide in said tracks to slidably adjust said pedal arm on said adjustor member so as to selectively move said pedal pad relative to said bracket.

15. A control pedal apparatus for a motor vehicle comprising:

a mounting bracket adapted to be mounted on a fixed structure of the vehicle;

a pedal assembly including an elongated pedal arm and an adjustor member;

pivot means on said pedal arm mounting the upper end of said pedal arm for pivotal movement on said bracket about a pivot axis;

a pedal pad mounted on the lower end of said pedal arm;

attachment means on said adjustor member defining an attachment point for attachment of a control member for operation of a control system of the vehicle in response to pivotal movement of said pedal assembly upon the application of operator pressure to said pedal pad;

guide means on said pedal arm spaced longitudinally along the length of said pedal arm from said pivot axis;

track means on said adjustor member slidably receiving said guide means;

an ut carried by said pedal arm; and a screw extending generally in the direction of said track means, threadably engaging said nut, and operative in response to rotation of said screw to cause said guide means to slide in said track means, to slidably adjust said pedal arm on said adjustor member so as to selectively move said pedal pad relative to said bracket.

16. A control pedal apparatus for a motor vehicle comprising:

a mounting bracket adapted to be mounted on a fixed structure of the vehicle;

a pedal assembly pivotally mounted on said bracket and including a pedal arm and an adjustor member;

a pedal pad secured to the lower end of said pedal arm; and means mounting said pedal arm for sliding adjustment on said adjustor member and mounting said pedal arm and adjustor member for joint pivotal movement on said bracket in any position of sliding adjustment of said pedal arm on said adjustor member in response to operator pressure on said pedal pad, said mounting means comprising a pair of spaced pins on said pedal arm slidably guiding in spaced tracks on said adjustor member.

* * * * *

UNITED STATES PATENT AND TRADEMARK OFFICE
CERTIFICATE OF CORRECTION

PATENT NO. : 5,078,024

DATED : January 7, 1992

INVENTOR(S) : Edmond B. Cicotte

It is certified that error appears in the above-identified patent and that said Letters Patent is hereby corrected as shown below:

Column 4, Line 48, Please insert after "rearwardly"
-- pivot pin 32 is moved downwardly in slots 10c and 12c. --.

Column 7, Line 7, After "pin guide" insert -- portions 58c, 60c are respectively received in the lower --.

Column 8, Line 49, After "edges" insert -- 64f of the cam plates but the pivotal movement of the cam --.

Column 12, Line 53, Please delete "anut" and insert -- a nut --.

Column 12, Line 63, Please delete "mounted on" and insert -- secured to --.

Signed and Sealed this

Fifteenth Day of June, 1993

Attest:

MICHAEL K. KIRK

*Attesting Officer*    Acting Commissioner of Patents and Trademarks